_United States Patent Office_

3,658,902
Patented Apr. 25, 1972

3,658,902
ACETYLENIC DIAMINES
Carl Bordenca, Ponte Vedra Beach, Fla., assignor to SCM Corporation, Cleveland, Ohio
No Drawing. Filed Aug. 21, 1969, Ser. No. 852,101
Int. Cl. C07c 93/10, 93/12
U.S. Cl. 260—563 R     14 Claims

ABSTRACT OF THE DISCLOSURE

Compounds of the formula:

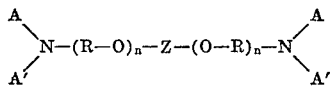

where the groups represented by A and A' are like or dissimilar alkyl, R is lower alkylene, Z is an alkynylene group containing from 4 to 16 carbon atoms and $n$ is a number of from 1 to 15 and stable salts thereof.

Also described are stable salts of the above compounds and compositions containing the compounds and salts, as well as processes for controlling arachnids. Compounds, compositions, and processes are advantageous in that they provide effective means of controlling arachnids such as, for example, mites, spiders, ticks, and the like without harming human beings or animal wildlife.

The invention relates to novel compounds and compositions which are effective in killing arachnids (e.g., Acarinae) such as spiders, mites, ticks and the like. The present invention further relates to processes for killing or controlling arachnid infestation. Conventional acaricides (arachnid killing agents) which are most widely used usually consist of chlorinated aryl and chlorinated cyclo-aliphatic compounds which may contain sulfur and also compounds containing a thiocarbamate group. Many conventional acaricides are disadvantageous in that they either do not decompose or they decompose and leave residues which are toxic to wildlife including fish and game animals as well as human beings.

There has presently been found a novel class of compounds which overcome the disadvantages of the more widely used conventional acaricides. The invention provides a class of compounds of the formula:

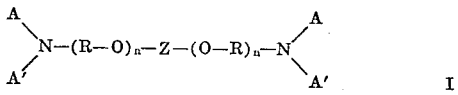

where A and A' are like or dissimilar lower alkyl, R is lower alkylene, Z is alkynylene containing from 4 to 16 carbon atoms, and $n$ is a number of from 1 to 15. Such compounds as well as their stable salts are effective in killing or controlling arachnids and/or arachnid infestions in concentrations as low as 0.1% based on the weight of the compositions in which they are employed.

In the foregoing formula, A and A' are like or dissimilar lower alkyl groups containing 1 to 6 carbon atoms but are preferably like lower alkyl for economic reasons. Compounds in which A and A' are ethyl have been found especially advantageous acaricides.

In the above formula, R is lower alkylene and can be methylene, ethylene, propylene, butylene, pentylene, or hexylene but is preferably ethylene for reasons of economics and physical properties of the compounds.

Z in the above formula is a symmetrical alkynylene group and contains from 4 to 16 carbon atoms. The acetylenic bond in the alkynylene group is between two central carbon atoms of the group, which group can further be symmetrically branched. Also, in the above formula, $n$ is a number of from 1 to 15, and compounds in which $n$ is 2 or more are actually lower alkylene oxide adducts of these acetylenic diamines. In a particularly advantageous class of compounds falling within the scope of the above formula, Z is represented by the following:

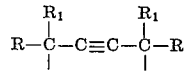
II where R is lower alkyl, either branched or straight chain containing 1 to 4 carbon atoms (e.g., methyl, ethyl, propyl, isopropyl, n-butyl, isobutyl) and where $R_1$ is a radical selected from the group consisting of hydrogen, methyl, ethyl, cyclopropyl, and phenyl.

Representative radicals which are advantageous and which fall within the scope of Formula I are those in which Z is 2-butyne-1,4-ylene
2,4,7,9-tetramethyl 5-decyne-4,7-ylene
4,7-dimethyl 5-decyne-4,7-ylene
2,3,6,7-tetramethyl 4-octyne-3,6-ylene
3,6-diethyl 4-octyne-3,6-ylene
2,5-dicyclopropyl 3-hexyne-2,5-ylene
3,6-dimethyl 4-octyne-3,6-ylene
2,5-diphenyl 3-hexyne-2,5-ylene
2,5-dimethyl 3-hexyne-2,5-ylene
5,8-dimethyl 6-dodecyne-5,8-ylene Compounds falling within the scope of Formula I where Z represents the foregoing radicals have been found to be especially advantageous acaricides.

In Formula I, $n$ can represent the number from between 1 and 15. It is most advantageously a number of between 1 and 10. Compounds within the scope of Formula I where $n$ is 1 are as follows:

1,4-di(N,N-diethylaminoethoxy)-2-butyne
4,7-di(N,N-diethylaminoethoxy)-5-decyne
4,7-dimethyl-4,7-di(N,N-diethylaminoethoxy)-5-decyne
2,3,6,7-tetramethyl-3,6-di(N,N-diethylaminoethoxy)-4-octyne
3,6-diethyl-3,6-di(N,N-diethylaminoethoxy)-4-octyne
2,5-dicyclopropyl-2,5-di(N,N-diethylaminoethoxy)-3-hexyne
3,6-dimethyl-3,6-di(N,N-diethylaminoethoxy)-4-octyne
2,5-diphenyl-2,5-di(N,N-diethylaminoethoxy)-3-hexyne
2,5-dimethyl-2,5-di(N,N-diethylaminoethoxy)-3-hexyne
5,8-dimethyl-5,8-di(N,N-diethylaminoethoxy)-6-dodecyne The foregoing compounds have been found to be especially advantageous miticides.

Compounds where $n$ is greater than 1 and can be a number of between about 2 and 15 are as follows:

4,7-di(N,N-diethylaminopolyethoxy)-5-decyne
4,7-dimethyl-4,7-di(N,N-diethylaminopolyethoxy)-5-decyne
2,3,6,7-tetramethyl-3,6-di(N,N-diethylaminopolyethoxy)-4-octyne -diethyl-3,6-di(N,N-diethylaminopolyethoxy)-4-
octyne
-dicyclopropyl-2,5-di(N,N-diethylaminopolyethoxy)-
1-hexyne
-dimethyl-3,6-di(N,N-diethylaminopolyethoxy)-4-
octyne
-diphenyl-2,5-di(N,N-diethylaminopolyethoxy)-3-
hexyne
-dimethyl-2,5-di(N,N-diethylaminopolyethoxy)-3-
hexyne
-dimethyl-2,5-di(N,N-diethylaminopolyethoxy)-6-
dodecyne The terms "acaricide" or "acaricidal compositions" as used herein are intended to mean and to include compounds and/or compositions which are effective in killing or controlling arachnids such as mites, spiders, ticks, etc. The term "acaricide environment" as used herein is intended to mean and to include areas or surfaces which are infested with or which are susceptible to infestation by arachnids including mites, spiders and ticks and the surfaces of the body of the arachnid itself including exoskeletal and non-skeletal surfaces. The acaricidal compounds and compositions of this invention when used to contact an arachnid environment remove the arachnids therefrom through death. The compounds and compositions of this invention are relatively non-toxic to higher animals and man and have been fed to warm-blooded animals in concentrations and amounts well above those which are acaricidally effective without significant adverse effects. The compounds and compositions containing them have also been applied in acaricidally effective amounts to the skin of human beings and laboratory animals (e.g. albino rabbits) without significant harmful effects. Compounds falling within the scope of the formula hereinbefore described are water insoluble and are generally soluble in organic solvents employed in agricultural and chemical formulations. The compounds are usually liquid, having the general properties of oils and boil between about 100° C. and 250° C., the boiling points being measured at a pressure of 1 mm. of mercury.

In one of its aspects, the invention provides a composition comprising a carrier and a miticidally effective quantity of one or more of the compounds falling within the scope of the formula hereinbefore described. The carrier is usually an inert diluent or a mixture of conventional carriers or diluents commonly employed and known in the art. The amount of miticidal (e.g., or acaricidal) compound employed can vary widely, but it is at least a miticidally effective amount. Generally, the miticide can vary between about 0.1 and about 90 weight percent, basis the weight of the compositions depending on the intended end use. Usually compositions will contain between about 0.1 to about 10 weight percent of one or more of the compounds hereinbefore described. The compounds are usually and preferably in intimate mixture with the carrier. When it is desired to use a miticidal composition, that is, without dilution, the amount of miticidal compound will usually vary from about 0.1 to about 0.5 percent of the composition. When it is desired to formulate concentrated compositions, that is, one suitable for dilution prior to end use, the miticidal compounds will usually be present in an amount of from about 0.5 to about 90 weight percent of the composition.

From a practical standpoint, compositions containing from 2.5 to about 10 weight percent of miticidal compounds can be effectively employed for general end use application.

As previously noted, the carrier employed can be any carrier conventionally used in the insecticide or miticide formulation art with the proviso that the carrier should be inert, that is, it should be incapable of undergoing a chemical reaction with the miticidal compound employed. The carrier should also be one that will not adversely affect the environment other than the arachnid to which it is employed.

The carrier can be any one of a wide variety of organic and inorganic liquid, solid, or semi-solid carriers or carrier formulations conventionally used in the art and can also be a mixture of such carrier.

Examples of organic liquid carriers include liquid aliphatic hydrocarbons such as pentane, hexane, and heptane, nonane, decane and their analogs as well as liquid aromatic hydrocarbons. Examples of other liquid hydrocarbons which are widely used for economic reasons include oils produced by the distillation of coal and the distillation of various types and grades of petrochemical stocks. Petroleum oils which are especially useful and economical include kerosene oils (e.g., oils composed of hydrocarbon mixtures of low molecular weight and which have from 10 to 16 carbon atoms), which are obtained by fractional distillation of petroleum at between 360° F. and 510° F. and which usually have a flash point between 150° F. and 185° F. Other petroleum oils include those generally referred to in the art as agricultural spray oils which are light and medium spray oils consisting of the middle fractions in the distillation of petroleum, and have a viscosity in the range of from 40–85 sec. Saybolt at 100° F. and are only slightly volatile. These oils are usually highly refined and contain only minute amounts of unsaturated compounds as measured by standard sulfonation tests. The customary sulfonation range of such oils is between 90 percent and 94 percent of unsulfonatable residue. These oils are paraffin oils and can be emulsified with water and an emulsifier and diluted to lower concentrations and used as sprays. Tall oils obtained from sulfate digestion of wood pulp, like paraffin oils, can also be employed.

In addition to the above-mentioned liquid hydrocarbons and often employed in conjunction therewith, the carrier can contain conventional emulsifying agents (e.g., a non-ionic surfactant such as an ethylene oxide condensate of octyl phenol or an anionic surfactant such as an alkali metal salt of an alkylbenzenesulfonic acid). Such emulsifiers are used to permit the composition to be dispersed in and diluted with water for end use applications.

When paraffin oils are employed as carriers in the insectiphobic compositions of this invention, they are usually used in conjunction with an emulsifier, the mixture being diluted with water immediately prior to the end use application. Other suitable paraffin oils, particularly those used with emulsions, are referred to in the art as heavy paraffin oils and usually have a viscosity greater than 85 sec. Saybolt at 100° F.

Other advantageous organic liquid carriers can include liquid terpene hydrocarbons and terpene alcohols (e.g., alphapinene, dipentene, terpineol, and the like). Still other liquid carriers include organic solvents such as aliphatic and aromatic alcohols, esters, aldehydes and ketones. Aliphatic monohydric alcohols include methyl, ethyl, n-propyl, isopropyl, n-butyl, sec-butyl, and t-butyl alcohols. Suitable dihydric alcohols include glycols such as ethylene and propylene glycol and the pinacols (alcohols having the empirical formula $C_6H_{12}(OH)_2$). Suitable polyhydroxy alcohols include glycerol, arabitol, erythritol, sorbitol and the like. Suitable cyclic alcohols include cyclopentyl and cyclohexyl alcohols.

Conventional aromatic and aliphatic esters, aldehydes and ketones may be employed and are usually used in combination with the above-mentioned alcohols. Still other liquid carriers including high-boiling petroleum products such as mineral oil and higher alcohols (sometimes referred to as "liquid waxes") such as cetyl alcohol, may also be employed.

Solid carriers which may be used in the compositions of this invention include finely divided inorganic solid materials. Suitable finely divided solid inorganic carriers include siliceous minerals such as clays (e.g., bentonite, attapulgite, fuller's earth, diatomaceous earth, kaolin, mica, talc, and finely divided quartz, etc.) as well as synthetically prepared siliceous materials such as silica aerogels and precipitated and fume silicas.

Examples of finely divided solid organic materials include starch, flour, sugar, sawdust, casein, gelatin and the like.

Examples of semi-solid carriers include petroleum jelly, lanolin and the like, and mixtures of liquid and solid carriers which provide semi-solid carrier products.

In another of its aspects, the invention provides a process for controlling arachnids which comprises contacting an arachnid environment with a compound falling within the scope of the formula hereinbefore described or a composition containing such compound. Contact may be accomplished directly, that is, by atomizing the composition into the air as a liquid or as a dust so that the material will fall on the arachnids. Alternatively, contact may be indirectly effected by contacting surfaces of areas in which the arachnids might crawl. By way of example, joists or beams infested with spiders can be contacted with compositions and spiders crawling over joists or beams will pick up sufficient amounts of active material to cause death. By way of further example, brush or forest areas infested with ticks such as the wood tick can be contacted with the compositions of this invention to remove tick infestation or death of these arachnids and to kill subsequent secondary infestation. By way of still further example, ornamental or food plants infested with mites such as the red spider mite can be contacted with the compositions of this invention to kill the mites and preserve the health of the plant which had been infested with the organism. By way of further example, tick infested animals such as dogs or cats may be treated with the miticidal compositions of this invention by contacting the fur and/or skin of the dogs and therefore the ticks engorged therein, thereby ending the infestation and preventing reinfestation for a significant period of time. The phytocidal symmetrical acetylenic etherial alkyl diamines of this invention are suitably prepared by reacting an acetylenic glycol such as those described in U.S. Pat. 2,997,447 patented Aug. 22, 1961 in the name of Russell et al. with a dialkylaminoalkane hydrohalide in the presence of an aqueous solution of an alkali metal hydroxide at a temperature in the range of from about 70° C. to about 90° C. Upon completion of the reaction, there is formed an aqueous layer and an oily layer, the latter containing the miticidal compound of this invention. The oily layer can thereafter be separated from the aqueous layer by convenutional means such as, for example, decantation. The reaction can most advantageously be effected by employing a slight stoichiometric excess of the dialkylaminohaloalkane hydrohalide.

Compounds falling within the scope of the above formula have limited water solubility but are soluble in solvents conventionally used in the pesticidal art. However, compounds falling within the scope of the above formula can readily be made water soluble by converting them into the corresponding ammonium salts (or tertiary amine salts) by reacting them with an appropriate acid such as, for example, hydrochloric, hydrobromic, sulfuric, phosphoric acids, etc., to form the corresponding hydrochloride, hydrobromide, acid sulfate, acid phosphate, and the like, salts. Such salts are readily soluble in water and can be applied to plants and soil infested with arachnids in the form of an aqueous solution. As will be hereinafter evident from the specific examples, such salts will readily kill mites, ticks, spiders, etc.

The following specific examples are intended to illustrate the invention but not to limit the scope thereof, parts and percentages being by weight unless otherwise specified.

EXAMPLE 1

Six separate dispersions containing 0.35 weight percent of the compounds listed below dispersed in a mixture consisting of 1% by weight of an emulsifying agent (specifically, Triton, a trademark of Rohm & Haas Company for an ethylene oxide condensate of ethylene oxide with octyl phenol), 5 weight percent of acetone, and the balance consisting essentially of water are prepared:

1,4-di(N,N-diethylaminoethoxy)-2-butyne
4,7-di(N,N-diethylaminoethoxy)-5-decyne
4,7-dimethyl-4,7-di(N,N-diethylaminoethoxy)-5-decyne
2,3,6,7-tetramethyl-3,6-di(N,N-diethylaminoethoxy)-4-octyne
3,6-diethyl-3,6-di(N,N-diethylaminoethoxy)-4-octyne
2,5-dicyclopropyl-2,5-di(N,N-diethylaminoethoxy)-3-hexyne Seven separate groups of 20 lima bean seedlings, each group infested with a total of 100 spider mites, were contacted with one of the above-described dispersions. Contact was effected by spraying 3 milliliters of the dispersion using a conventional spraying device into the air at a distance of 12" above the plant groups. Each of the six groups were treated with one of the dispersions, the seventh group serving as an untreated control. The amount of compound sprayed into the air was 10.5 milligrams in each instance. All groups of plants were examined for mites after ten days. The mites killed in all of the six separate groups of seedlings ranged between 75 and 100 percent of the mites initially present. All of the mites in the untreated group of plants were alive.

When the corresponding propylaminoether analogs and the diethylaminopropyl analogs were employed in place of the above-listed compounds, substantially identical results are obtained.

EXAMPLE 2

The procedure of Example 1 was repeated except that the following ethers were employed in place of the ethers employed in Example 1:

3,6-dimethyl-3,6-di(N,N-diethylaminoethoxy)-4-octyne
2,5-diphenyl-2,5-di(N,N-diethylaminoethyl)-3-hexyne
2,5-dimethyl-2,5-di(N,N-diethylaminoethoxy)-3-hexyne
5,8-dimethyl-5,8-di(N,N-diethylaminoethoxy)-6-dodecyne
4,7-di(N,N-diethylaminopolyethoxy)-5-decyne
4,7-dimethyl-4,7-di(N,N-diethylaminopolyethoxy)-5-decyne Examination of the lima bean plants after 10 days resulted in a range of kill of between 70 and 100 percent of the mites in each group of plants. All the mites in the untreated control group of plants were alive.

EXAMPLE 3

The procedure of Example 1 was repeated except that the below-listed compounds were employed in place of the compounds employed in Example 1:

2,3,6,7-tetramethyl-3,6-di(N,N-diethylaminopolyethoxy)-4-octyne
3,6-diethyl-3,6-di(N,N-diethylaminopolyethoxy)-4-octyne
2,5-dicyclopropyl-2,5-di(N,N-diethylaminopolyethoxy)-3-hexyne
3,6-dimethyl-3,6-di(N,N-diethylaminopolyethoxy)-4-octyne
2,5-diphenyl-2,5-di(N,N-diethylaminopolyethoxy)-3-hexyne
2,5-dimethyl-2,5-di(N,N-diethylaminopolyethoxy)-3-hexyne In all instances, 75 percent or more of the mites were killed and the untreated control plant groups exhibited no mite kill.

EXAMPLE 4

The procedure of Examples 1, 2, and 3 were repeated except that the hydrochloride derivatives of the compounds were employed in place of the compounds employed in those examples. In all instances, more than 80 percent of the mites were killed.

EXAMPLE 5

The procedure of Example 4 was repeated except that corresponding acid sulfate salts of the compounds employed in Examples 1, 2, and 3 were employed in place of the compounds employed in those examples. In all instances, the results were substantially identical to those obtained in Example 4.

What is claimed is:

1. A compound of the formula:

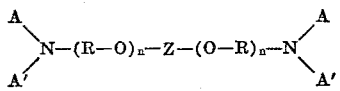

where A and A′ are lower alkyl, R is lower alkylene, Z is alkynylene containing from 4 to 16 carbon atoms, and n is a number of from 1 to 15, and stable salts thereof.

2. The compound of claim 1 where A and A′ are lower alkyl.

3. The compound of claim 2 where R is ethylene.

4. A compound of claim 3 where Z is a radical containing an acetylenic bond, and is represented by the formula

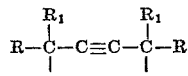

where R is an alkyl group containing from 1 to 4 carbon atoms, and $R_1$ is selected from the group consisting of hydrogen, methyl, ethyl, cyclopropyl and phenyl.

5. The compound of claim 4 where Z is 2,4,7,9-tetramethyl-5-decyne-4,7-ylene.

6. The compound of claim 4 where Z is 4,7-dimethyl-decyne-4,7-ylene.

7. The compound of claim 4 where Z is 2,3,6,7-tetramethyl-4-octyne-3,6-xylene.

8. The compound of claim 4 where Z is 3,6-diethyl-4-octyne-3,6-ylene.

9. The compound of claim 4 where Z is 2,5-dicyclopropyl-3-hexyne-2,5-ylene.

10. The compound of claim 4 where Z is 3,6-dimethyl-4-octyne-3,6-ylene.

11. The compound of claim 4 where Z is 2,5-diphenyl-3-hexyne-2,5-ylene.

12. The compound of claim 4 where Z is 2,5-dimethyl-3-hexyne-2,5-ylene.

13. The compound of claim 4 where Z is 5,8-dimethyl-6-dodecyne-5,8-ylene.

14. The compound of claim 3 where Z is 2-butyne-1,4-ylene.

References Cited

UNITED STATES PATENTS

| | | | |
|---|---|---|---|
| 2,941,967 | 6/1960 | Möller et al. | 260—584 (B)X |
| 3,230,183 | 1/1966 | Valko et al. | 260—584 (B)X |
| 3,267,122 | 8/1966 | Lehmann et al. | 260—584 C UX |
| 3,379,761 | 4/1968 | Wilhelm | 260—570.7 |
| 2,997,447 | 8/1961 | Russell et al. | 252—351 |
| 3,446,843 | 5/1969 | Bordenca et al. | 260—563 |

JOSEPH REBOLD, Primary Examiner

R. L. RAYMOND, Assistant Examiner

U.S. Cl. X.R.

260—570.7, 584 B, 584 C, 666 R, 668 R, 678; 424—325